United States Patent [19]

Downing, Jr.

[11] 4,375,831
[45] Mar. 8, 1983

[54] GEOTHERMAL STORAGE HEATING AND COOLING SYSTEM

[76] Inventor: James E. Downing, Jr., 2221 Middlehurst Dr., Columbus, Ohio 43219

[21] Appl. No.: 164,089

[22] Filed: Jun. 30, 1980

[51] Int. Cl.³ .................. F25B 29/00; F25B 27/02
[52] U.S. Cl. ................................ 165/48 R; 165/45; 62/238.7; 62/260; 62/335; 237/2 B
[58] Field of Search .................. 165/45, 50, 48, 48 S, 165/18; 62/238.7, 260, 324.1, 235.1, 335, 332; 237/2 B; 126/435, 400

[56] References Cited

U.S. PATENT DOCUMENTS

| | | | |
|---|---|---|---|
| 3,965,972 | 6/1976 | Petersen | 165/45 |
| 4,012,920 | 3/1977 | Kirschbaum | 62/235.1 |
| 4,070,870 | 1/1978 | Bahel et al. | 62/235.1 |
| 4,129,177 | 12/1978 | Adcock | 165/48 S |
| 4,153,104 | 5/1979 | Ruder | 165/48 S |
| 4,215,551 | 8/1980 | Jones | 165/45 X |
| 4,237,859 | 12/1980 | Goettl | 126/400 |
| 4,255,936 | 3/1981 | Cochran | 165/45 X |
| 4,257,239 | 3/1981 | Partin et al. | 62/260 X |
| 4,277,946 | 7/1981 | Bottum | 165/45 X |

Primary Examiner—Samuel Scott
Assistant Examiner—Margaret A. Focarino
Attorney, Agent, or Firm—Robert B. Watkins

[57] ABSTRACT

An indoor space environment heating and cooling system in which a massive thermal storage unit is interposed between a geothermal heat energy storage capacity—the earth—and a heat pump heating and/or cooling apparatus for controlling and maintaining the environment in an indoor living space. A fluid circulation apparatus is provided to circulate a working fluid from the massive thermal storage unit directly to a heat exchanger in the indoor space environment conditioning apparatus, to provide cooling when the temperature of the thermal storage unit is less than the temperature in the living space.

6 Claims, 2 Drawing Figures

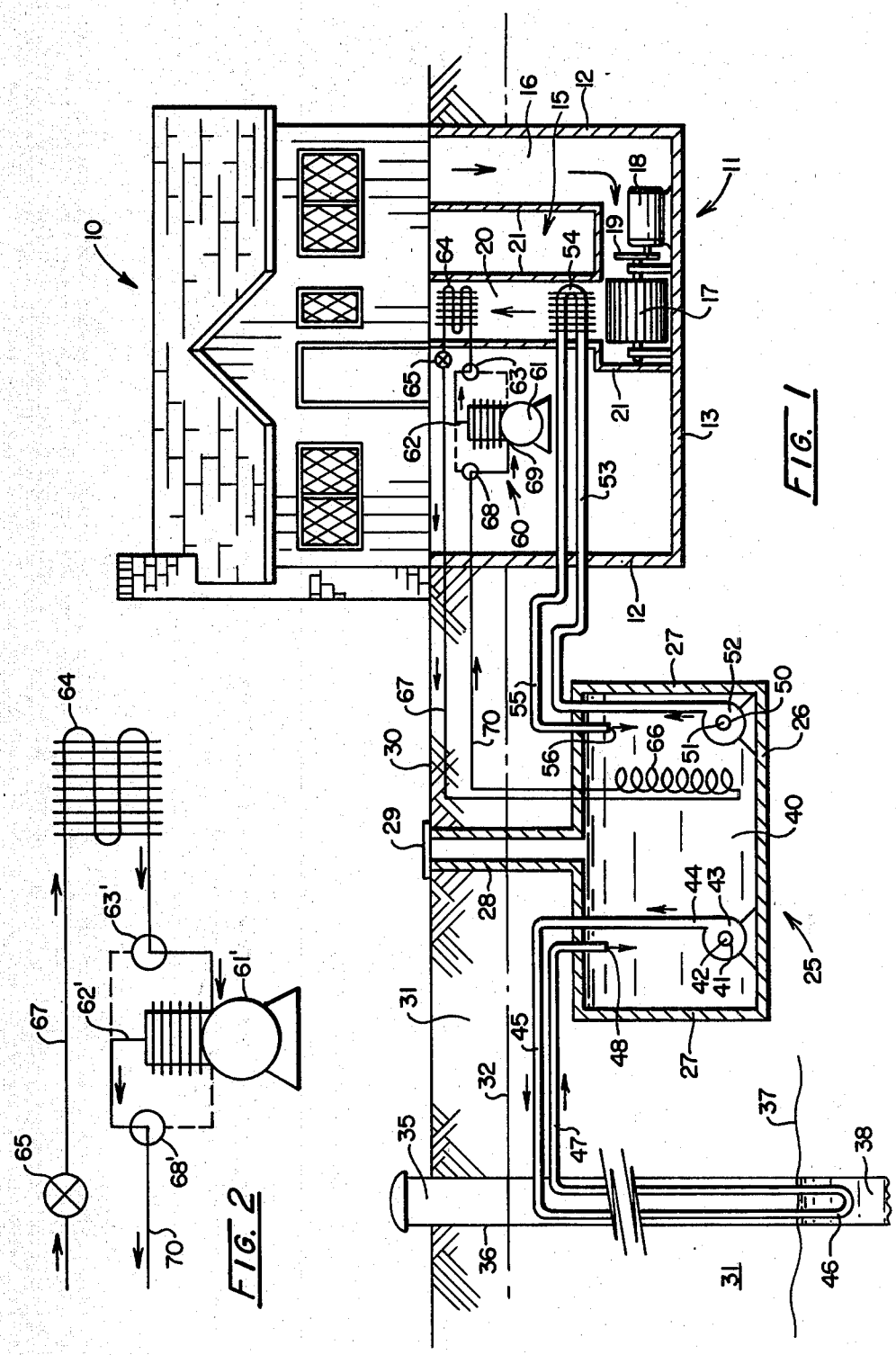

GEOTHERMAL STORAGE HEATING AND COOLING SYSTEM

SUMMARY OF THE INVENTION

This invention relates to a geothermal storage system for heating and cooling the environment of indoor living space. More particularly, it relates to such a system in which a massive thermal storage unit is interposed between a geothermal storage capacity of substantially infinite size—the earth—and mechanical heat exchange apparatus in contact with the living space.

With the increased demand for energy throughout the world and the consequent increase in value and cost has come a change in the perception of value of alternate sources of energy. Sources of energy which were considered too expensive or too dear in prior times are now becoming appropriate sources as other sources such as fossil fuel become more expensive and more scarce.

It has long been known that the earth's temperature remains substantially constant at levels below the frost line and within several hundred feet of the surface of the earth. Nevertheless, this area has not universally been thought of as a source of energy and the term geothermal has been more universally applied to those unusual occurrences of nature when hot fluids such as water and gas occur in pockets beneath the earth and have been tapped for their heat content. The conceptual model of an energy "source" involves entirely different behavioral characteristics from energy "storage" capacity.

For the purposes of this invention, the earth below the surface shall be considered a geothermal storage unit of such large capacity to be uneffected by the rate of heating and cooling required for maintaining the environment of contiguous living space at normal human comfort levels day in, day out, year round, in all but the most severe climates of the world. That is to say, that the vastness of the earth in the area near the surface of a depth of several hundred feet is a geothermal reservoir of sufficient capacity to store the amount of heat necessary to maintain adjacent contiguous living space in the range of 70° F. in the coldest winter weather for periods exceeding the maximum recorded cold weather. Likewise, this vast geothermal storage unit has the capacity to absorb the excess heat necessary to render living space temperate and comfortable for periods longer than the most protracted recorded periods of hot weather in all but the most extreme weather places of the world.

The present invention is a complete system for providing space heating and cooling, for an indoor living space which will bring the heat from the geothermal storage capacity—the earth—to the indoor living space during the heating season and will extract heat from the indoor living space and absorb the heat into storage during the cooling season. In the system, a relatively massive thermal storage unit is interposed between the geothermal storage capacity—the earth—and the indoor living space environment which is to be heated and cooled. A working fluid, such as water, is circulated between the massive thermal storage unit, such as a large tank for the storage of water, and the geothermal storage capacity—the earth. Mechanical heat exchange apparatus, preferably a heat pump, is operatively connected between the massive thermal storage unit and the indoor living space environment.

In addition, a working fluid, such as water, is circulated between heat exchangers, one of which is located in the massive thermal storage unit in contact with the working fluid therein and the second of which is located in the indoor living space environment.

More specifically, in a preferred embodiment of the invention, water is circulated in a closed circuit between a well which projects below the water table of the earth and a large water storage tank adjacent to a building containing the living space that is to be heated and cooled to provide year round comfort. A second water circulating system circulates water by pumping means through a heat exchanger within the large water storage tank and a heat exchanger in a forced air space conditioning heating and cooling apparatus of the building. In addition, a heat pump means, having a working fluid such as Freon, compresses and circulates the working fluid from an oversized evaporator in which an evaporation coil is submerged in the large water storage tank through a condenser in the forced air space conditioning system of the building by means of a compressor and expansion valve within the heat pump apparatus means. The evaporator is sized so that even though refrigeration occurs, the temperature decrease is minimal so that the highly advantageous temperature of 45° F. (6.85° C.) is maintained.

An important feature of the present invention is the closed circuit circulatory system between the geothermal storage capacity—the earth—and the massive thermal storage unit—the water tank. In this system the working fluid, water, circulates through the area of the geothermal storage capacity in a closed circulating loop. Heat exchange contact between the earth and the circulating working fluid is preferably maintained by passing the closed end loop of the circulating system through a water well which has been excavated to a depth well below the water table and through which subterranean water is constantly moving. Because the system is a closed loop, the subterranean water is undisturbed in its flow and quantity, and is therefore, constant in flow and undepleted by the action of the system.

Another important feature of the invention is the relatively massive size of the thermal storage unit which is interposed between the earth and the heat exchange apparatus. Since the thermal storage unit is the center of a closed system, neither requiring a constant input of working fluid, nor having a constant exhaust of working fluid, a relatively large unit may be used and once filled, will require only an insignificant amount of make-up and further cost. Thus, it can economically be of relatively large size and capacity, and can be capable of absorbing large quantities of heat and conversely providing large quantities of heat in the cooling and heating season, respectively.

Because in many climates the amount of sunshine is limited and less than preferred, heating and cooling systems having thermal storage capacity are frequently found in solar heating designs and concepts.

Various methods and apparatus have been proposed in the past which use thermal storage units in conjunction with water in the earth to provide space heating and cooling in buildings. These various methods and apparatus have been utilized with limited success. A solar heating system using underground wells is shown in U.S. Pat. No. 3,965,972—Peterson. A solar heating system using an underground tank is shown by Cornwall in U.S. Pat. No. 2,533,302. A thermal storage apparatus in the basement of a building is shown in U.S. Pat.

No. 3,236,294—Thomason. U.S. Pat. No. 4,129,177—Adcock shows a solar heating and cooling system in which thermal energy storage bags are used.

The above cited patents are provided in compliance with 37CFR Rule 1.56.

Other important features of the invention will be apparent from the drawings and detailed description of the invention which follows.

BRIEF DESCRIPTION OF THE DRAWINGS

FIG. 1 is a partial vertical sectional view of a dwelling house having indoor living space environment heating and cooling requirements, and the principle elements of the heating and cooling system of the invention.

FIG. 2 is a schematic diagram of a portion of the apparatus of this invention shown in a different operating mode from that shown in FIG. 1.

DETAILED DESCRIPTION OF THE INVENTION

Referring to FIG. 1, a dwelling house structure 10 is shown above a basement 11 having walls 12 and a floor 13. Space heating and cooling apparatus 15 is shown in the basement 11 including a circulating/incoming (return) air duct 16, a circulating fan/blower 17 driven by a motor means 18 with belts 19 and an outgoing (supply) air duct 20.

The detailed construction of the space heating and cooling apparatus is in general conventional having, typically, a plurality of sheet metal sides 21 connected to registers (not shown) in the walls and floors of the dwelling house structure 10.

A massive thermal storage unit means 25 includes, preferably, a water storage tank 26 having ends 27, and access conduit 28 and a lid 29. Thermal storage unit 25 is placed beneath the surface 30 of the ground 31 below the frost line 32. Preferably it is constructed of thick concrete which is relatively inexpensive; and being dense it adds to the thermal storage of the unit.

However, the thermal storage unit 25 may be of steel or concrete construction materials depending on local factors such as terrain, composition of the earth and economic considerations.

The pressure within the tank 26 is substantially atmospheric; and therefore pressure vessel type construction is not required.

A working fluid 40, preferably water, is introduced into and fills the tank 26 to a maximum desired level depending on operating criteria and economical considerations of the locality.

A well 35 having a casing 36, is established down into the earth 31 to a depth below the water table 37. Subterranean water 38 fills the well 35 to the water table 37.

A closed circuit circulation subsystem for the working fluid 40 is provided, including as shown in FIG. 1, a conduit/piping 41 passing from an inlet 42 below the surface of the fluid 40 to the inlet of a submersed pump means 43 through an outlet 44 into an outlet piping/conduit 45. The outlet piping conduit 45 continues beneath the frost line 32 into the well 35 through casing 36 where a heat exchange loop 46 passes through the subterranean water 38 beneath the water table 37, and through a return conduit 45 to an outlet 48 in the tank 26 of working fluid 40.

Operation of the pump means 43 circulates the working fluid 40 in the direction of the arrows through the conduits 41, 45 from the tank 26 in a closed loop of continuous circulation.

In a second circulation subsystem of the working fluid 40, a conduit 50 circulates working fluid 40 from an inlet 51 to the intake of a second submersed pumping means 52, which discharges into an outlet conduit 53 through a heat exchanger 54 which is located in the supply air duct 20. From the heat exchanger 54, a conduit 55 carries the working fluid 40 back into the tank 26 through and outlet 56.

The massive thermal storage unit 25 of this invention in combination with the thermal storage capacity of the earth 31 makes possible the use of the greatly simplified cooling subsystem using the pump means 52. With the working fluid 40 at a substantially constant temperature of 45° F. (6.85° C.) during the cooling season, substantial cooling for the living space can be provided at the heat exchanger 54 by the circulation of the working fluid 40 directly between the thermal storage unit and the heat exchanger.

A typical average cooling load of 36,000 (1.91 K Cal/sec.) BTU per hour can be absorbed by water circulating from the storage tank through the heat exchanger at the rate of 15 (0.001 M$^3$ per sec.) gallons per minute.

The temperature of the water 40 in the tank 26 can be maintained at substantially a 45° F. (6.85° C.) temperature by circulation as necessary through the well 35 by operation of pump means 43.

As shown in FIG. 1, the pump means 43, 52 are located within the thermal storage tank 26 (submerged). Alternatively, these pumps could be located in other places such as in the basement 11 of the dwelling house 10, or on the surface 28 outside the house.

Referring again to FIG. 1, heat pump apparatus means 60 includes a compressor 61 for a refrigerant gas, such as Freon. Heat pump means 60 is connected through a compressed gas outlet 62, and a reversing valve 63 to a heat exchanger 64 in the supply air duct 20. The heat exchanger 64 is connected to an expansion valve 65, which is in turn, connected to an evaporator/heat exchanger 66 through expander conduit 67. The evaporator/heat exchanger 66 is connected through a second reversing valve 68 to an inlet 69 of the compressor 61 by means of a conduit 70.

As shown in the embodiment of FIG. 1, the heat pump means 60 is set by means of the reversing valves 63 and 68 in the heating mode of operation. In this mode, Freon gas is compressed in the compressor 61 to a pressure of about 250 lbs. per sq. in. (0.065 Kg/M$^2$) and a temperature of approximately 180° F. (78° C.) At this temperature, it passes through the heat exchanger 64 giving up heat to circulating air forced upward through the supply air duct 20 by the blower 17. The cooled gas is expanded in the valve 65, passes into the liquid state, and flows into the evaporator/heat exchanger 66 in a chilled state at a temperature of about 35° F. (1.7° C.) In the evaporator/heat exchanger 66, the Freon absorbs heat from the working fluid 40 and evaporates to a gaseous state passing through conduit 70, valve 68 and into the compressor 61 at inlet 69.

The operation of the heat pump apparatus of the type used in this invention is well known, although successful operation depends on the successful control of various variables. A very important variable is the temperature of the working fluid in outside contact with the evaporator during the heating mode. Because water, as a working fluid, is more expansive than ambient air, many heat pumps have been operated with ambient air as the working fluid at the evaporator. Also in the past, because electrical energy was relatively inexpensive, heat pump compressors were designed to operate long and hard to extract heat from ambient air which was at a very low temperature during the heating season. In addition to the amount of work necessary to extract heat from low temperature air, there was often the problem of moisture freezing in the air contacting the evaporator.

With the increased cost in electrical energy, more heat pump installations have been designed for water as the working fluid across the evaporator in recent years. The water may be from any source, but usually water from a central system in an urban area is found to be too expensive as a working fluid. Natural water from wells in the vicinity of the heat pump have been used successfully in reducing electrical energy costs in the operation of heat pumps. These systems are not entirely satisfactory since prolonged low temperature heating seasons require large quantities of water if the evaporator discharge is being wasted. Also, if the water discharge is being returned to the water well the temperature of the water in the well is reduced which decreases the temperature of the heat pump evaporator when it is recirculated.

In the operation of the system of this invention, the heat pump is rendered more efficient over a protracted period of time and the efficiency is substantially unaffected by the outside weather and temperature conditions. The system of this invention combines the relatively infinite heat storage capacity of the earth at substantially constant temperature, about 45° F., (6.85° C.), with a relatively massive thermal storage unit located conveniently near the heat pump means and the indoor living space cooling means.

Assuming a home heating consumption rate of 1,000,000 BTU's (50 KC) per day, which would be quite high but could be the consumption that would be required several times during a winter, a 1500 gallon (6000 Liter) water tank is an adequate massive thermal storage unit for the heating mode of the system of this invention. The average furnace produces 100,000 BTU's (5 KC) per hour and would run 10 hours to produce 1,000,000 BTU's (50 KC).

Working fluid water comes from the well at about 45° F. (6.85° C.) In the typical closed circulation system of this invention, water 40 is circulated at the rate of approximately 20 gallons per minute by the electric motor driven pump 43 through three quarter inch plastic tubing between the well 35 and the thermal storage tank 26. In constant operation during each day, 28,800 gallons (109,440 Liters) of water would flow through the well in the closed loop circulation system. Considering a temperature change of 4° F. (1° C.) higher as it passes through the well 921,200 BUT's (46.06 KC) would move from the well into the thermal storage unit per day.

The temperature of the water in the thermal storage tank remains substantially constant at about 45° F. (6.58° C.) The evaporator 66 of the heat pump 60 is in contact with the working fluid 40 substantially at constant optimum temperature. At the expansion valve 65 the refrigerant gas expands into the heat exchanger 64 at a temperature of about 35° F. (1.7° C.) The passing warm air from the living space is cooled and dried giving heat to the refrigerant gas which passes to the inlet of the compressor.

In some locations the water table is very low and it may not be economical or possible to connect the massive thermal storage unit to the geothermal storage capacity of the earth by means of a well. In such a situation, a circulation subsystem from the thermal storage unit through subterranean ground coils buried below the frost level can be used to provide the geothermal storage capacity. The ground coils would then be larger piping and more than extensive tubing into a well.

In some circumstances in order to further reduce electrical energy requirements and where first cost may not be an important criterion, a circulation subsystem between heating panels on the roof of the dwelling house and the thermal storage unit could be provided. If this were done, the temperature and heat in storage in the thermal storage unit would be raised during the heating season to further increase the efficiency of the heat pump operation.

In some climates, under certain rare conditions, it may be necessary on occasion to provide additional cooling for the living space of the dwelling 10. This is accomplished as necessary by reversing the heat pump 60, as shown in FIG. 2.

Referring to FIG. 2, the refrigerant compressor 61 is connected from an outlet 62 and reversing valve 68 to heat exchanger 66 through conduit 70. The heat exchanger 66 is connected through conduit 67 and the expansion valve 65 to the heat exchanger 64 in the supply air duct 20. The heat exchanger 64 is connected through reversing valve 63 to the compressor 61.

In operation, refrigerant gas is compressed in the compressor 61, to a temperature of about 180° F. (78° C.) and a pressure of about 250 lbs. per square inch (0.065 Kg/M$^2$). In heat exchanger 66 it is cooled giving up heat to the working fluid 40.

A heat pump set in the heating mode in combination with a massive thermal storage unit as shown in FIG. 1, can also be connected in heat exchange relationship with a hot water heating tank. Because the heat pump has a constant inexpensive source of working fluid at 45° F. (5.68° C.) at the evaporator, it will provide sufficient heat to the water for many purposes.

It is herein understood that although the present invention has been specifically disclosed with preferred embodiments and examples, modifications and variations of the concept herein disclosed, may be resorted to by those skilled in the art. Such modifications and variations are considered to be within the scope of the invention and the appended claims.

What is claimed is:

1. A geothermal system for heating and cooling the environment of indoor living space, comprising:
 (a) a massive thermal storage means;
 (b) a geothermal storage capacity means connected to the massive thermal storage means in a heat transfer relationship by a first subsystem comprising a closed circuit for conducting a working fluid between the massive thermal storage means and the geothermal storage capacity means as induced by a first pumping means in the closed circuit, the geothermal storage capacity means being the earth;
 (c) heat pump means operably connected to a first heat exchanger in the environment of the living space and operably connected to a second heat exchanger in the massive thermal storage means in heat exchange contact with the working fluid; and (d) a second subsystem comprising a closed circuit for conducting the working fluid between the massive thermal storage means and a third heat exchanger in the environment of the living space connected in heat exchange contact with the working fluid.

2. A geothermal system according to claim 1 wherein the massive thermal storage means is a tank and the working fluid is a liquid.

3. A geothermal system according to claim 1 wherein the massive thermal storage means is a tank containing water.

4. A geothermal system according to claim 1 wherein the geothermal storage means is the earth and the closed circuit of the first subsystem passes through a well of subterranean water from the earth.

5. A geothermal system according to claim 1 wherein the thermal storage means has access to atmospheric pressure.

6. A geothermal system according to claim 1 wherein the first heat exchanger and the third heat exchanger are placed in the air supply duct of a forced air space heating and cooling apparatus.

* * * * *